United States Patent [19]

Dowd

[11] Patent Number: 4,968,411
[45] Date of Patent: Nov. 6, 1990

[54] METHOD OF TREATING A HYDROCARBON CHARGESTOCK

[75] Inventor: Edward J. Dowd, Palatine, Ill.

[73] Assignee: ARI Technologies, Inc., Palatine, Ill.

[21] Appl. No.: 381,819

[22] Filed: Jul. 19, 1989

Related U.S. Application Data

[62] Division of Ser. No. 176,110, Mar. 30, 1988, Pat. No. 4,885,268.

[51] Int. Cl.$^5$ .............................................. C01G 19/02
[52] U.S. Cl. ..................................... 208/206; 208/207
[58] Field of Search .............................. 208/206, 207

[56] References Cited

U.S. PATENT DOCUMENTS

| | | | |
|---|---|---|---|
| 3,039,855 | 6/1962 | Urban | 23/225 |
| 3,108,081 | 10/1963 | Gleim et al. | 502/163 |
| 3,692,842 | 9/1972 | Massie | 502/163 |
| 4,003,827 | 1/1977 | Carlson et al. | 208/206 |
| 4,049,572 | 9/1977 | Douglas | 502/163 |

*Primary Examiner*—Patrick P. Garvin
*Attorney, Agent, or Firm*—Marshall, O'Toole, Gerstein, Murray & Bicknell

[57] ABSTRACT

A catalyst composition useful in the catalytic oxidation of mercaptans is disclosed. The composition is a stable aqueous slurry or suspension of a first component which is predominantly a metal phthalocyanine disulfonate compound, and a second component which is predominantly a tetrasulfonated metal phthalocyanine compound.

17 Claims, No Drawings

METHOD OF TREATING A HYDROCARBON CHARGESTOCK

CROSS-REFERENCE TO RELATED APPLICATION

This is a division of copending, commonly assigned application Ser. No. 07/176,110 filed Mar. 30, 1988, now U.S. Pat. No. 4,885,268 issued Dec. 5, 1989.

BACKGROUND OF THE INVENTION

1. Field of the Invention

The present invention relates generally to catalyst compositions and, more particularly, the invention relates to a catalyst useful in the conversion of mercaptans to disulfides in petroleum distillate chargestocks.

2. Description of Related Art

The removal of mercaptan sulfur from hydrocarbons, particularly petroleum distillates, such as cracked gasolines, straight gasolines, etc., is an ongoing problem. Mercaptans are objectionable due to their corrosive nature and their strong odor.

A well known and generally accepted process for treating hydrocarbon fractions to convert mercaptans to less objectionable disulfides by catalytic oxidation is the UOP Merox ® process. In one form, the Merox ® process uses a catalyst which is soluble in caustic solution in liquid-liquid contact with the hydrocarbon fractions.

The type of catalyst most widely used in the Merox ® process and similar types of mercaptan oxidation processes include sulfonated derivatives of metal phthalocyanine compounds. Cobalt phthalocyanine sulfonates are preferred.

The preparation and use of metal phthalocyanine sulfonates having mono-, di-, tri-, and tetra sulfonate functionality is well described in the literature. See, for example, U.S. Pat. Nos. 3,039,855 (Urban), 3,108,081 (Gleim), 4,003,827 (Carlson, et al.), and 4,049,572 (Douglas), all assigned to Universal Oil Products Company, and Fukada, in Nippon Kagoku Zasshi, Volume 79, at pages 396–399 (1958). Each of the foregoing patents and publication is incorporated herein by reference.

Metal phthalocyanine sulfonates, in particular cobalt phthalocyanine sulfonates, differ in activity and in their solubility characteristics depending at least in part on their respective sulfonate functionalities. This has caused a number of problems for users of these materials.

For example, cobalt phthalocyanine disulfonate, commonly used in mercaptan oxidation units calling for two phase liquid-liquid contact, was at one time sold in a dry powdered form which was extremely dusty. This was undesirable because cobalt phthalocyanine sulfonates are strong dyes. Several different approaches were attempted in order to eliminate handling problems, including the packaging of disulfonate material in water soluble bags; mixing the material with an antidusting agent such as PTFE; and admixing the disulfonate compound with water and selling the product as a slurry.

Although the packaging of cobalt phthalocyanine disulfonate as an aqueous slurry is widely accepted, this approach suffers from several problems. With insufficient mixing, the disulfonate material precipitates from the slurry. If the slurry is mixed sufficiently to retain the disulfonate in suspension for acceptable lengths of time, the slurry becomes extremely viscous and may gel, making it very difficult to remove the material from packaging.

The use of cobalt phthalocyanine tetrasulfonate, which is highly soluble in water, can eliminate the precipitation and gelation problems associated with the use of disulfonate slurries. However, reports of actual operating experience in the field and laboratory tests indicate that the catalytic activity of the tetrasulfonate form of cobalt phthalocyanine is not as high as that of the disulfonate form.

SUMMARY OF THE INVENTION

It is an object of the invention to overcome one or more of the problems described above.

According to the invention a stable, fluid (i.e. non-gelatinous) aqueous slurry of metal phthalocyanine sulfonate catalyst is provided. The inventive catalyst composition has acceptably high activity, with the desirable stable fluid handling properties associated with prior metal phthalocyanine tetrasulfonate solutions.

The inventive catalyst composition is a stable suspension or slurry of a blend of first and second components, the first component being predominantly a metal phthalocyanine disulfonate, and the second component being predominantly a metal phthalocyanine tetrasulfonate, with a total sulfonate concentration of up to about 3 lbs. per gallon of slurry or suspension.

Further objects and advantages will be apparent to those skilled in the art from a review of the following detailed description, taken in conjunction with the appended claims.

DETAILED DESCRIPTION OF THE INVENTION

According to the invention a stable, fluid catalyst composition useful in, for example, the catalytic oxidation of mercaptans to disulfides in hydrocarbon fractions is provided by forming a slurry or suspension of a blend of first and second metal phthalocyanine sulfonate components. The respective first and second components may be prepared separately, blended, and subsequently dispersed in water or, alternatively, they may be coproduced and subsequently dispersed in water.

The first component is predominantly metal phthalocyanine disulfonate, which may be in admixture with mono-, tri-, and tetrasulfonated forms of the metal phthalocyanine compound. However, the disulfonate form of the metal phthalocyanine compound should comprise at least 50 wt. % of the sulfonate compounds of the first component.

A typical "spectrum" analysis of disulfonated cobalt phthalocyanine compounds is given in Example I, Table I of Carlson, et al. U.S. Pat. No. 4,003,827, as follows:

| Isomer | Wt. % |
| --- | --- |
| Monosulfonate | 6.3 |
| Disulfonate | 59.6 |
| Trisulfonate | 25.6 |
| Tetrasulfonate | 8.5 |
| Total | 100.0 |

A composition of 60 wt. % disulfonate, 10 wt. % tetrasulfonate, and 30 wt. % mono- plus trisulfonate should be considered typical of commercially available disulfonated cobalt phthalocyanine compounds. Those skilled in the art, however, will recognize that the actual percentage ranges will vary in practice, and are exclusive of inert salts and other diluents which may be present.

The second component of the metal phthalocyanine compound blend is predominantly the tetrasulfonated isomer of the metal phthalocyanine sulfonate compound. Although it has been reported that tetrasulfonated metal phthalocyanine compounds are available in substantially pure form, in practice the second component may contain very small amounts of the mono-, di-, and trisulfonate isomers. According to the invention, the tetrasulfonate isomer comprises at least about 99 wt. % of the metal phthalocyanine sulfonates in the second component of the blend, exclusive of inert salts and other diluents which may be present.

The blend of metal phthalocyanine sulfonate components broadly comprises between about 9 and 91 wt. % of the first (predominantly disulfonate) component and, correspondingly, between about 91 and 9 wt. % of the second (predominantly tetrasulfonate) component.

It is preferred that the total concentrations of disulfonated and tetrasulfonated metal phthalocyanine compounds (based on total metal phthalocyanine sulfonates in the composition) be in the range of about 30 to 55 wt. % disulfonates and at least about 18 wt. % tetrasulfonates, respectively, with a total concentration of mono- and trisulfonates not exceeding about 30 wt. %.

The inventive composition has a concentration of from greater than zero to about 3 lbs. of total metal phthalocyanine sulfonate compounds per gallon of composition, although a total concentration of about 2½ lbs. total metal phthalocyanine sulfonate compounds per gallon of composition may be the practical maximum for most applications. It is highly preferred that the metal phthalocyanine sulfonate concentration be in the range of about 2 to 2½ lbs. per gallon of slurry or suspension.

The preferred forms of the metal compound used in the invention are sulfonated cobalt phthalocyanine compounds.

The disulfonated isomers may be prepared by processes known in the art, and are commercially available. It is preferred that the tetrasulfonated isomer be prepared by the method of Fukada, *Nippon Kagoku Zasshi*, Volume 79, at pages 396–399 (1958), the disclosure of which is incorporated herein by reference, which involves the reaction of a 4-sulfophthalic compound, a metal salt, and an ammonium donor.

Useful modifications of this procedure are described in Weber and Busch, *Inorg. Chem.* Vol. 4, at 469–71 and 472–75 (1965), the respective disclosures of which are incorporated herein by reference.

An exemplary synthesis reaction scheme uses sulfophthalic acid, urea, cobalt chloride, and an ammonium molybdate catalyst. The sulfophthalic acid is typically used in aqueous solution comprising 50 wt. % water, 12.5 wt. % 3-isomer, and 37.5 wt. % 4-isomer.

The catalyst composition of the invention is useful in any of the well known liquid-liquid mercaptan oxidation processes using metal phthalocyanine catalysts. For example, the liquid catalyst composition may be dissolved in caustic solution with the reaction being carried out at a pH of 8 to 14.

The inventive catalyst composition preferably should not be used in treating certain hydrocarbon fractions that contain components which extract sulfonated metal phthalocyanine compounds from the caustic phase, resulting in high losses of catalyst and discoloration of the chargestock. (Tetrasulfonates are not known to be extractable to a significant degree.) For example, some gasolines are believed to contain glycols which extract disulfonates, and possibly mono- and trisulfonates, from a caustic phase containing the inventive composition.

One surprising aspect of the present invention is the ability to form a slurry or suspension of sulfonated metal phthalocyanine compounds containing high concentrations of the disulfonated form of the metal phthalocyanine compound without precipitation of disulfonated metal phthalocyanine material For example, it is possible according to the invention to prepare compositions wherein the disulfonated material comprises up to 55 wt. % of the total sulfonated phthalocyanines without experiencing precipitation, or gelation of the solution upon thorough mixing.

Furthermore, the catalytic activity of the composition is acceptably high for all commercial applications.

Thus, the desirable mechanical properties of the composition greatly enhance the material handling characteristics thereof without a sacrifice of acceptable catalytic activity.

From the foregoing description, those skilled in the art will appreciate that the invention comprehends a method of stabilizing metal phthalocyanine disulfonates in a fluid slurry or suspension by blending or coproduction with tetrasulfonated metal phthalocyanine compounds, in respective concentrations as taught herein.

The invention further comprehends a method of treating a hydrocarbon fraction such as a petroleum distillate chargestock to catalytically oxidize mercaptans wherein the inventive catalyst composition is dispersed in a liquid phase at an alkaline pH which is placed in two phase liquid-liquid contact with the fraction to be treated under appropriate treatment conditions as are well known in the art. Preferably, the composition is dispersed in a caustic phase (pH about 8 to 14) and contacted with the chargestock in an oxygen-containing atmosphere at a temperature of about 15° to 300° C. and a pressure of about 1 to 100 atmospheres.

The foregoing detailed description is given for clearness of understanding only, and no unnecessary limitations should be understood therefrom, as modifications within the scope of the invention will be obvious to those skilled in the art.

I claim:

1. A method of treating a hydrocarbon chargestock containing mercaptans comprising the steps of:
   (i) dispersing a catalyst in a caustic aqueous phase, wherein said catalyst comprises a catalyst composition consisting essentially of a stable fluid slurry or suspension of a blend of first and second metal phthalocyanine sulfonate components in water, said first component comprising a metal phthalocyanine disulfonate compound, said disulfonate compound comprising at least 50 wt. % of the metal phthalocyanine sulfonates in said first component, said second component comprising a metal phthalocyanine tetrasulfonate compound, said tetrasulfonate compound comprising at least 99 wt. % of the total metal phthalocyanine sulfonates in said second component, said second component comprising between about 9 and 91 wt. % of the total of said first and second components, and the total concentration of said metal phthalocyanine sulfonates being greater than zero and up to about 3 lbs. per gallon of said slurry or suspension; and (ii) contacting said aqueous phase with said hydrocarbon chargestock in an oxygen containing atmosphere wherein said chargestock is in liquid contact with said aqueous phase.

2. The method of claim 1 wherein said caustic aqueous phase is at a pH of about 8 to about 14.

3. The method of claim 1 wherein said contacting occurs at a temperature of about 15° to about 300° C. and said atmosphere is at a pressure of about one to about 100 atmospheres.

4. The method of claim 1 wherein said first and second metal phthalocyanine sulfonate components are cobalt phthalocyanine sulfonate components.

5. The method of claim 1 wherein said second component consists essentially of said metal phthalocyanine tetrasulfonate compound.

6. The method of claim 1 wherein said catalyst composition includes sulfonated metal phthalocyanine derivatives selected from the group consisting of monosulfonates and trisulfonates, with the total concentration of said monosulfonates and trisulfonates not exceeding 30 wt. % of total sulfonated metal phthalocyanine compounds in said composition.

7. The method of claim 1 wherein the total concentration of said first and second components is between about 2 and 2.5 lbs. per gallon of said slurry or suspension.

8. The method of claim 1 wherein the sulfonated metal phthalocyanine compounds in said composition comprise from about 30 to about 50 wt. % disulfonated metal phthalocyanine compounds, up to about 30 wt. % combined mono- and trisulfonated metal phthalocyanine compounds, and at least 18 wt. % tetrasulfonated metal phthalocyanine compounds.

9. A method of treating a hydrocarbon chargestock containing mercaptans comprising the steps of:
  (i) dispersing a catalyst in a caustic aqueous phase, wherein said catalyst comprises a catalyst composition consisting essentially of a stable fluid slurry or suspension of a blend of first and second metal phthalocyanine sulfonate components in water, said first component comprising a metal phthalocyanine disulfonate compound, said disulfonate compound comprising at least 50 wt. % of the metal phthalocyanine sulfonates in said first component, said second component comprising a metal phthalocyanine tetrasulfonate compound, said tetrasulfonate compound comprising at least 99 wt. % of the total metal phthalocyanine sulfonates in said second component, said second component comprising between about 9 and 91 wt. % of the total of said first and second components, and the total concentration of said metal phthalocyanine sulfonates being greater than zero and up to about 3 lbs. per gallon of said slurry or suspension; and
  (ii) contacting said aqueous phase with said hydrocarbon chargestock in an oxygen containing atmosphere, wherein said chargestock is in liquid contact with said aqueous phase and said chargestock is substantially free of components which extract sulfonated metal phthalocyanine compounds from said caustic aqueous phase.

10. The method of claim 9 wherein said caustic aqueous phase is at a pH of about 8 to about 14.

11. The method of claim 9 wherein said contacting occurs at a temperature of about 15° to about 300° C. and said atmosphere is at a pressure of about one to about 100 atmospheres.

12. The method of claim 9 wherein said components which extract metal sulfonated phthalocyanine compounds are glycols.

13. The method of claim 9 wherein said first and second metal phthalocyanine sulfonate components are cobalt phthalocyanine sulfonate components.

14. The method of claim 9 wherein said second component consists essentially of said metal phthalocyanine tetrasulfonate compound.

15. The method of claim 9 wherein said catalyst composition comprises sulfonated metal phthalocyanine derivatives selected from the group consisting of monosulfonates and trisulfonates, with the total concentration of said monosulfonates and trisulfonates not exceeding 30 wt. % of total sulfonated metal phthalocyanine compounds in said composition.

16. The method of claim 9 wherein the total concentration of said first and second components is between about 2 and 2.5 lbs. per gallon of said slurry or suspension.

17. The method of claim 9 wherein sulfonated metal phthalocyanine compounds in said composition comprise from about 30 to about 50 wt. % disulfonated metal phthalocyanine compounds, up to about 30 wt. % combined mono- and trisulfonated metal phthalocyanine compounds, and at least 18 wt. % tetrasulfonated metal phthalocyanine compounds.

* * * * *